United States Patent
Bruins et al.

(10) Patent No.: US 11,540,492 B2
(45) Date of Patent: Jan. 3, 2023

(54) HATCHER BASKET WITH EXTERNAL FEED TROUGHS

(71) Applicant: PAS REFORM B.V., Zeddam (NL)

(72) Inventors: Wouter Sebastiaan Bruins, Leiden (NL); Wil Marijn Stutterheim, Leiden (NL); Kevin Johannes Rubertus Koenders, Zeddam (NL)

(73) Assignee: PAS REFORM B.V., Zeddam (NL)

( * ) Notice: Subject to any disclaimer, the term of this patent is extended or adjusted under 35 U.S.C. 154(b) by 66 days.

(21) Appl. No.: 16/628,344

(22) PCT Filed: Jul. 4, 2018

(86) PCT No.: PCT/NL2018/050438
§ 371 (c)(1),
(2) Date: Jan. 3, 2020

(87) PCT Pub. No.: WO2019/009715
PCT Pub. Date: Jan. 10, 2019

(65) Prior Publication Data
US 2020/0146264 A1 May 14, 2020

(30) Foreign Application Priority Data
Jul. 5, 2017 (NL) .................................... 2019188

(51) Int. Cl.
| | |
|---|---|
| *A01K 31/19* | (2006.01) |
| *A01K 41/04* | (2006.01) |
| *A01K 39/01* | (2006.01) |
| *A01K 39/02* | (2006.01) |

(52) U.S. Cl.
CPC .............. *A01K 31/19* (2013.01); *A01K 41/04* (2013.01); *A01K 39/01* (2013.01); *A01K 39/02* (2013.01)

(58) Field of Classification Search
CPC ........ A01K 31/19; A01K 31/18; A01K 41/02; A01K 41/00; A01K 39/01; A01K 39/02
See application file for complete search history.

(56) References Cited

U.S. PATENT DOCUMENTS

| | | |
|---|---|---|
| 1,813,847 A | 7/1931 | Gorsuch |
| 1,942,765 A | 1/1934 | Mott |
| 1,973,530 A | 9/1934 | Hart |

(Continued)

FOREIGN PATENT DOCUMENTS

WO   2011133020 A1   10/2011

*Primary Examiner* — Monica L Perry
*Assistant Examiner* — Aaron M Rodziwicz
(74) *Attorney, Agent, or Firm* — Nixon Peabody LLP; Ronald I. Eisenstein; Nicole D. Kling

(57) ABSTRACT

The present invention relates to a hatcher basket for holding newly hatched birds in an incubator. The basket has: —a pair of side walls on horizontally opposite sides having a plurality of horizontally-extending openings through them; —a horizontally-extending trough which is attached to the exterior of each side wall and which can contain feed for the newly hatched birds; —the bottom of each opening in each side wall being located at the same distance above the bottom of the side wall; —the top of each trough being located at this same distance above the bottom of its side wall; and —the size of each opening being significantly larger than the head of the newly hatched birds but significantly smaller than the thorax of the newly hatched birds.

10 Claims, 1 Drawing Sheet

(56) References Cited

U.S. PATENT DOCUMENTS

| | | | | |
|---|---|---|---|---|
| 1,986,501 | A | * | 1/1935 | Conway ................. A01K 31/19 119/302 |
| 2,467,525 | A | * | 4/1949 | Fricke .................. A01K 1/0356 119/417 |
| 2,588,868 | A | | 3/1952 | Napier |
| 2,697,413 | A | | 12/1954 | Douglas |
| 3,620,193 | A | * | 11/1971 | Alberto German Frers ................ A01K 39/01 119/456 |
| 3,752,123 | A | * | 8/1973 | Classe ..................... A01K 1/03 119/480 |
| 3,903,851 | A | * | 9/1975 | Van Huis ............... A01K 31/17 119/478 |
| 4,020,793 | A | * | 5/1977 | Morrison ............ A01K 31/002 119/479 |
| 10,375,934 | B2 | * | 8/2019 | Huisinga .............. A01K 31/002 |
| 2007/0199516 | A1 | * | 8/2007 | Koch ..................... A01K 31/19 119/300 |

* cited by examiner

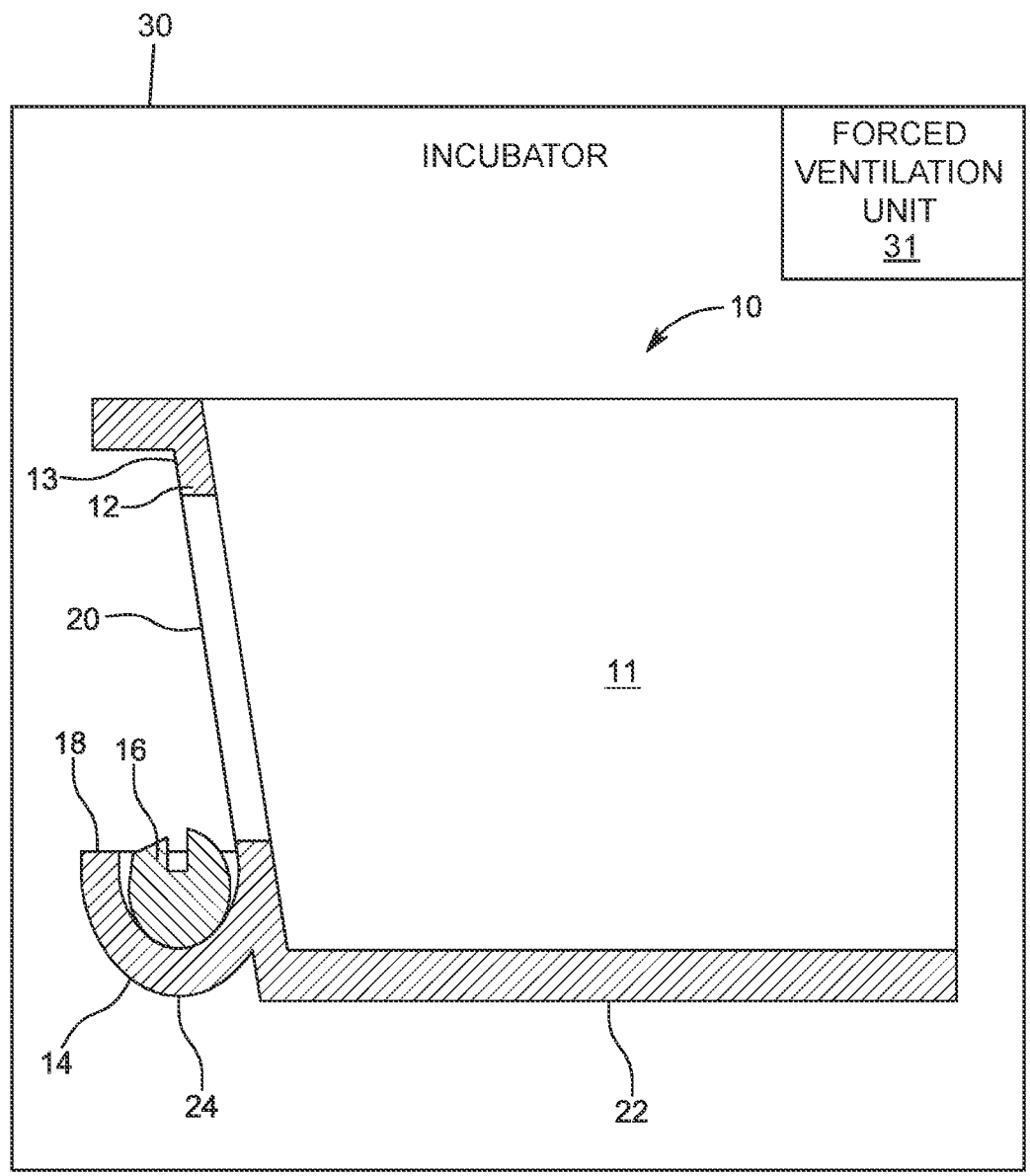

HATCHER BASKET WITH EXTERNAL FEED TROUGHS

CROSS-REFERENCE TO RELATED APPLICATIONS

This application is a 35 U.S.C. § 371 National Phase Entry Application of International Application No. PCT/NL2018/050438 filed Jul. 4, 2018, which designates the U.S. and claims benefit under 35 U.S.C. § 119(a) of NL Provisional Application No. 2019188 filed Jul. 5, 2017, the contents of which are incorporated herein by reference in their entireties.

FIELD OF THE INVENTION

The present invention relates to a hatcher basket or egg tray provided with a trough containing feed for consumption and digestion by a bird immediately or soon after its hatching from its egg during its incubation. The invention particularly relates to a feed trough for a hatcher basket, in which the feed will be readily available to the bird but not become quickly contaminated with waste material from the bird.

BACKGROUND OF THE INVENTION

In raising poultry, newly laid eggs are typically incubated in large batches under hot, i.e., about 37° C., and dry conditions for up to 21 days until all the fertilized eggs have hatched, or until they should have hatched. Only then the batch of newly hatched birds are removed, and fed with a starter or pre-starter source of feed for the birds.

Normally, most chicken eggs hatch in the period between 18 and 21 days after incubation has begun. Unfortunately, many of the chicks that hatch earlier, rather than later, during the final three days of incubation, suffer subsequent growth and disease problems. These problems arise principally because of a lack of feed, available to the chicks that hatch earlier during these last three days for their consumption. Research has shown that these chicks, for their further development and resistance to diseases, would benefit from providing feed as soon as possible after hatching. See: "Spread of hatch and delayed feed access affect post hatch performance of female broiler chicks up to day 5" *Animal* (2014), 8:4, pp 610-617; and "The Effects of the Spread of Hatch and Interaction with Delayed Feed Access After Hatch on Broiler Performance Until Seven Days of Age" 2005 *Poultry Science* (2005) 84:1314-1320. For this reason, it has been recommended that newly hatched chicks be fed with a feed such as a corn-wheat-soybean-based starter diet, immediately after hatching.

Ways have been sought for providing all newly hatched chicks in incubators with feed as soon as possible after hatching and thereafter until they are placed in a final poultry or egg-laying farming environment where they will be fed a conventional corn and soybean meal containing essential vitamins and minerals.

U.S. Pat. No. 33,965,703 describes a hatching house for chicks with a belt, on which eggs can hatch, and feed troughs adjacent to the belt for the newly hatched chicks.

WO0234039A1 describes an incubator for chicks containing stacked hatcher baskets, in each of which is water and feed for newly hatched chicks.

U.S. Pat. Nos. 8,196,548 and 8,272,352 describe stacked hatcher baskets for incubators for chicks, in each of which baskets are troughs for feed for newly hatched chicks. Because the troughs are in each basket, the troughs become dirty quite quickly with waste from the chicks that falls from upper baskets on to lower baskets. Also, chicks are likely to get soiled and wet quite quickly if the feed is provided with a source of water, which is undesirable in view of the fact that the feathers of a chick are highly relevant for maintaining its body temperature. These patents also describe an automated feeder for replenishing feed in each trough, requiring each basket to be pulled out completely from the incubator, so that the basket beneath it can be disposed beneath the automated feeder for filling its toughs.

WO2011133020A1 describes stacked hatcher baskets for incubators for chicks, each of which baskets has, attached to its opposite sides, troughs for feed for newly hatched chicks. The opposite sides of each basket have feed openings, through which chicks can access each trough to feed on its feed contents. As a result, the troughs become dirty quite quickly with waste from the chicks that have gone into the troughs from the baskets.

There has been a continuing need, therefore, for another way of providing feed to newly hatched chicks in hatching baskets in incubators, without the feed becoming rapidly contaminated with waste material from the chicks.

SUMMARY OF THE INVENTION

It is therefore an object of the present invention to provide a way of feeding newly hatched birds in hatching baskets during incubation, advantageously without the feed for the newly hatched birds becoming contaminated with waste material from the birds.

Accordingly, one aspect of the present invention relates to a hatcher basket which is adapted to enclose newly hatched birds and which includes:

- a plurality of upstanding side walls and a bottom wall attached to the bottom of the side walls; among the side walls being a laterally-extending side wall, advantageously a pair of the laterally-extending side walls on longitudinally opposite sides of the hatcher basket; each laterally-extending side wall having one or more, preferably a plurality of, longitudinally-extending openings from an interior of the hatcher basket to an exterior of the hatcher basket;
- a laterally-extending side wall, advantageously a pair of the laterally-extending side walls on longitudinally opposite sides of the hatcher basket, each laterally-extending side wall having one or more, advantageously a plurality of, longitudinally-extending openings from an interior of the hatcher basket to an exterior of the hatcher basket;
- a horizontal, laterally-extending, elongated trough, advantageously a pair of the troughs, each trough being attached to an exterior of the hatcher basket on an exterior surface of one of the laterally-extending side walls and each trough being adapted to contain feed for the birds;
- the bottom of each hole in each laterally-extending side wall being located at a same distance;
- the top of each trough being located at the same distance above the bottom of the laterally-extending side wall, to which it is attached; and
- the size of each opening being significantly larger than the average cross-sectional size of the head of the newly hatched birds but significantly smaller than the average cross-sectional size of the thorax of the newly hatched birds.

Advantageously, a pair of the troughs are on a pair of laterally-extending side walls on longitudinally opposite sides of the hatcher basket. Also advantageously, the length of each trough is much larger than its width. Also advantageously, the bottom of each trough is not significantly below the bottom of the laterally-extending side wall, to which the trough is attached. Particularly advantageous is that the bottom of each trough is substantially coplanar with the bottom of the laterally-extending side wall, to which the trough is attached.

Another aspect of the present invention relates to a use of the hatcher basket as just described for feeding newly hatched birds undergoing incubation, advantageously without the feed becoming contaminated with waste material from the birds.

BRIEF DESCRIPTION OF THE DRAWINGS

Shown schematically in the FIGURE is a sectional view of a longitudinal side of a hatcher basket of this invention, taken longitudinally along the lateral middle of the hatcher basket.

DETAILED DESCRIPTION OF THE INVENTION

Unless otherwise stated, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

The terms "lateral" and "longitudinal" are used herein as relative terms for describing elements of the hatcher basket of this invention as shown in the FIGURE and described herein. If desired, laterally-extending elements of the hatcher basket can be changed to longitudinally-extending elements of the hatcher basket and vice versa in accordance with this invention. Likewise, laterally-opposite sides of the hatcher basket can be changed to longitudinally-opposite sides of the hatcher basket and vice versa in accordance with this invention.

The term "feed" as used herein preferably means any cultivated cereal that is conventionally fed to immature birds, such as corn, rice, wheat and/or soybean as described in CN 104489391 A of 8 Apr. 2015. In this regard, feed for newly hatched birds, particularly newly hatched chicks, can a specially prepared and formulated mixture of grains, such as a conventional corn-wheat-soybean-based starter mixture.

The term "edible insect" as used herein preferably means an insect which can be safely used as a feed source for humans and/or birds and can also be consumed and/or digested by newly hatched birds. Examples of edible insects are set forth in the report: "Edible insects: future prospects for feed and feed security", FAO Forestry Paper 171, Feed and Agriculture Organization of the United Nations (Rome, 2013); and in the articles: "Insects—a natural nutrient source for poultry—a review", Ann. Anim. Sci., Vol. 16, No. 2 (2016) 297-313; "Black soldier fly as dietary protein source for broiler quails . . . ", Animal, pages 1-8, © The Animal Consortium 2016; and "Extraction and characterisation of protein fractions from five insect species", Food Chemistry 141 (2013) 3341-3348. Among "edible insects" are grasshoppers, soldier flies, crickets, cockroaches, termites, lice, stink bugs, cicadas, aphids, scale insects, psyllids, beetles, caterpillars, flies, fleas, bees, wasps and ants, as well as desert locusts, housefly maggots and silkworms The term "larva" or "larvae" as used herein preferably means the active immature form of an edible insect which can be consumed and digested by newly hatched birds. A preferred edible insect larva for newly hatched birds is a lesser meal worm larva.

The term "deep eutectic solvent" as used herein preferably means a mixture of water and two or more metabolites which DES can be safely consumed by a newly hatched bird undergoing incubation and which has a much lower vapour pressure than water and a much lower melting point than any of its components. The metabolites of a DES can generally be any plant or animal (e.g., mammal, fish, reptile, bird or insect) metabolites, i.e., compounds naturally occurring in a plant or animal cell, but can also be synthetic metabolites, provided they can be safely consumed. For certain applications, preferred metabolites of a DES will be those found naturally in a newly hatched bird that is to consume the DES. Generally preferred metabolites include sugars (particularly sucrose, D-glucose, D-galactose, D-mannose, D-fructose, D-xylose, D-trehalose, raffinose and maltose), sugar alcohols (particularly glycerol, adonitol, xylitol, ribitol, 1,2-propanediol, inositol, meso-erythritol and D-sorbitol), amino acids (particularly betaine, betanine, proline, arginine, asparagine, betalaine, lysine, threonine, putrescine, cadaverine, glucosamine, glutamine, and alanine), organic acids (particularly lactic acid, malic acid, citric acid, malonic acid, maleic acid, aconitic acid, L-tartaric acid, succinic acid, neuraminic acid, sialic acid, fumaric acid, aspartic acid, glutamic acid [preferably in salt form] and phytic acid [preferably in salt form]) and choline derivatives (particularly choline chloride, acetylcholine, choline citrate and choline bitartrate).

The term "bird" as used herein preferably means males or females of any avian species but is primarily intended to encompass poultry which are commercially raised for eggs or meat. Accordingly, the term "bird" is particularly intended to encompass chickens, turkeys, ducks, geese, quails, doves, ostriches, emus, guinea fowl and pheasants.

The term "newly hatched bird" as used herein preferably means a bird, more preferably a chick, duckling, baby goose or baby turkey, yet more preferably a chick, which: has hatched less than 7 days previously, more preferably has hatched less than 3 days previously, yet more preferably has hatched less than 1 day previously, still more preferably has just hatched or is about to hatch.

The term "incubation" herein preferably means a process by which oviparian animals, such as birds hatch their eggs, and to the development of the embryo within the egg after leaving the adults' tract. The term "incubation period" herein preferably means the uninterrupted time during which an egg is subjected to conditions simulating brooding until hatching, i.e. emergence of the hatchlings, including any handling or transfers from e.g. an incubator to a hatchery.

Shown in the FIGURE is one lateral side of a hatcher basket, generally 10, in accordance with this invention which is adapted to enclose newly hatched birds. A plurality of hatcher baskets 10 can be stacked vertically in a conventional manner in an incubator 30 for hatching birds within the walls of the hatcher and allowing the newly hatched birds to mature there until being removed for further handling. The hatcher basket 10 has a pair of longitudinally-extending, upstanding side walls 11 on laterally-opposite sides of the hatcher basket 10 and a pair of laterally-extending, upstanding side walls 12 on longitudinally-opposite sides of the hatcher basket. Attached to the exterior of the hatcher basket on the exterior surface 13 of one or both, preferably each, of the laterally-extending side walls 12 is a horizontal, laterally-extending, elongated trough 14. The trough 14 can contain feed 16 for consumption and digestion by newly hatched birds (not shown) undergoing incubation. Each trough 14 preferably extends laterally along substantially the entire length of the exterior surface 13 of its laterally-extending side wall 12, to which the trough is attached. The top 18 of each trough 14 is vertically open, so that the trough can be easily filled with feed and accessed by the newly hatched birds in each basket 10 through one or more, preferably a plurality of, openings 20 extending longitudinally through one or both, preferably both, of the laterally-extending side walls 12 from the interior to the exterior of the hatcher basket. The upper surface of a horizontal, longitudinally- and laterally-extending bottom wall 22 of the hatcher basket is attached to the laterally-extending bottom of each of the side walls 11 and 12.

The shape of each of the openings 20 in a laterally-extending side wall 12 is not critical and can, for example, be round, square, rectangular or elliptical. In this regard, one or more horizontally-elongated elliptical slots can be used instead of a plurality of round openings in a side wall. The bottom of each of the openings 20 in each laterally-extending side wall 12 is preferably at a same distance above the bottom of the laterally-extending side wall 12 and above the upper surface of the bottom wall 22 of the hatcher basket 10. The top 18 of each trough 14 is preferably vertically located on its laterally-extending side wall 12 at the aligned bottom of the openings 20 in its laterally-extending side wall. The size, particularly the height, of each opening 20 is significantly larger than the average cross-sectional size of the head of the newly hatched birds but significantly smaller than the average cross-sectional size of the thorax of the newly hatched birds. Thereby, the newly hatched birds can stick their heads, but not their bodies, through the openings 20 to eat the feed 16 in the troughs 14—without contaminating the troughs and their feed contents with waste material from the birds. Preferably, the maximum number of openings 20 is provided in each laterally-extending side wall 12 to facilitate access of the newly hatched birds to the feed in each trough 14.

Particular dimensions for the length, width and depth of the troughs 14 on the exterior surfaces 13 of the laterally-extending side walls 12 of the hatcher basket 10 are not critical. However, the length of each trough 14 (measured laterally with regard to the hatcher basket) is preferably much larger than its width (measured longitudinally with regard to the hatcher basket). The width of each trough is preferably significantly larger than the average cross-sectional height of the head of the newly hatched birds. Preferably, the bottom 24 of each trough 14 is not significantly below the bottom of its laterally-extending side wall 12 of the basket 10 and preferably not significantly below the upper surface of the bottom wall 22 of the basket. Particularly preferred is that the bottom 24 of the trough is substantially coplanar with the bottom of its laterally-extending side wall 12 and preferably with the upper surface of the bottom wall 22 of the basket. Thereby, feed 16 can be provided in each trough 14, extending upwardly from the bottom 24 of the trough to the bottom of each opening 20 in each laterally-extending side wall 12, so that the newly hatched birds in the basket 10 can easily access the feed by simply extending their heads through one of the openings 20.

The troughs 14 preferably contain, besides feed, a source of water for consumption by newly hatched birds. Feed and water for the birds can be in the form of edible insects and/or edible insect parts, preferably whole edible insects, more preferably whole edible insects that are alive, still more preferably whole live edible insect larvae. Alternatively or in addition, water for the birds can be provided as an exogenous deep eutectic solvent that includes water and two or more, primary metabolites, preferably selected from sugars, sugar alcohols, amino acids, organic acids and choline derivatives.

Also in accordance with this invention, a method is provided for feeding newly hatched birds undergoing incubation, the method comprising the step of: incubating such newly hatched birds in the hatcher baskets 10, described above.

Further in accordance with this invention, bird eggs can be placed in stacked egg trays or hatcher baskets in a setter for incubation during their first 18 days after being laid. The stacked hatcher baskets can then be transferred into a hatcher for the last three days of their incubation. The setter and hatcher can each have a multi-level incubation shelf system that can hold a multitude of stacked hatcher baskets, each of which holds a multitude of eggs. The setter and hatcher each typically provide the eggs with controlled air flow and temperature for incubation, preferably in climate controlled chambers. During incubation, eggs are kept in the hatcher baskets until the birds hatch (after about 18-21 days for chicks). After hatching, the newly hatched birds can be transported by truck in conventional stacked transport baskets to a poultry house.

The present invention also relates to an incubator for hatching of birds from eggs, comprising one or more hatchers as set out above, and a forced ventilation unit 31 for guaranteeing suitable ventilation to maintain the temperature, humidity and oxygen levels for the eggs and hatched chicks, and optionally, a light source. The incubator preferably further comprises a rack for moving the one or more hatchers, whether stacked or in trays. The incubator preferably further comprises a (re)filling unit for filling and/or replenishing the one or more troughs of the hatcher with a source of food and/or water.

The invention claimed is:

1. An incubator for hatching of birds from eggs, comprising one or more hatcher baskets, and a forced ventilation unit for guaranteeing suitable ventilation to maintain the temperature, humidity, and oxygen levels for the eggs and hatched chicks; wherein the one or more hatcher baskets are adapted to enclose newly hatched birds in an incubator and provide them with feed, preferably without the feed becoming contaminated with waste material from the newly hatched birds; and each of the one or more hatcher baskets comprises:

a plurality of upstanding side walls and a bottom wall attached to the bottom of the plurality of upstanding side walls; among the plurality of upstanding side walls being one or more laterally-extending side walls, each laterally-extending side wall having one or more-longitudinally-extending openings from an interior of the hatcher basket to an exterior of the hatcher basket;

at least one horizontal, laterally-extending, elongated trough, each horizontal, laterally-extending, elongated trough being attached to the exterior of the hatcher basket on an exterior surface of one of the laterally-extending side walls and each horizontal, laterally-extending, elongated trough being adapted to be filled with feed for the newly hatched birds and accessed by the newly hatched birds for consumption and digestion by the newly hatched birds;

the bottom of each of the one or more longitudinally-extending openings in each laterally-extending side wall being located at a same distance above a bottom of the laterally-extending side wall;

a top of each horizontal, laterally-extending, elongated trough being located at the same distance above the bottom of the one of the laterally-extending side walls that the horizontal, laterally-extending, elongated trough is attached to; and each of the one or more longitudinally-extending openings being a size which is significantly larger than an average cross-sectional size of a head of the newly hatched birds but significantly smaller than an average cross-sectional size of the thorax of the newly hatched birds.

2. The incubator of claim 1, wherein the bottom of each horizontal, laterally-extending, elongated trough is not significantly below the bottom of the laterally-extending side wall to which the horizontal, laterally-extending, elongated trough is attached.

3. The incubator of claim 2, wherein the bottom of each horizontal, laterally-extending, elongated trough is substantially coplanar with the bottom of the laterally-extending side wall to which the horizontal, laterally-extending, elongated trough is attached.

4. The incubator of claim 1, further comprising a rack for moving the one or more hatchers.

5. The incubator of claim 1, each hatcher basket comprising a pair of laterally-extending side walls on longitudinally opposite sides of the hatcher basket.

6. The incubator of claim 1, wherein each laterally-extending side wall has a plurality of longitudinally-extending openings from the interior of the hatcher basket to the exterior of the hatcher basket.

7. A method for feeding newly hatched birds undergoing incubation, the method comprising the step of: incubating such newly hatched birds in a hatcher basket comprising:

a plurality of upstanding side walls and a bottom wall attached to the bottom of the plurality of upstanding side walls; among the plurality of upstanding side walls being one or more laterally-extending side walls, each laterally-extending side wall having one or more-longitudinally-extending openings from an interior of the hatcher basket to an exterior of the hatcher basket;

at least one horizontal, laterally-extending, elongated trough, each horizontal, laterally-extending, elongated trough being attached to the exterior of the hatcher basket on an exterior surface of one of the laterally-extending side walls and each horizontal, laterally-extending, elongated trough being adapted to be filled with feed for the newly hatched birds and accessed by the newly hatched birds for consumption and digestion by the newly hatched birds;

the bottom of each of the one or more longitudinally-extending openings in each laterally-extending side wall being located at a same distance above a bottom of the laterally-extending side wall;

a top of each horizontal, laterally-extending, elongated trough being located at the same distance above the bottom of the one of the laterally-extending side walls that the horizontal, laterally-extending, elongated trough is attached to; and each of the one or more longitudinally-extending openings being a size which is significantly larger than an average cross-sectional size of a head of the newly hatched birds but significantly smaller than an average cross-sectional size of the thorax of the newly hatched birds.

8. The method of claim 7, further comprising a) providing the hatcher basket, b) providing a multitude of bird eggs in the hatcher basket, c) subjecting the bird eggs to incubation conditions for up to 21 days until all the fertilized eggs have hatched, or until they should have hatched, and d) providing starter or pre-starter source of feed and/or water in the one or more horizontal, laterally-extending, elongated troughs such that newly hatched birds may access the starter or pre-starter source of feed and/or water for the birds through one or more of the longitudinally-extending openings.

9. The method of claim 7, further comprising i) placing the bird eggs in stacked egg trays or hatcher baskets in a setter for incubation during their first 18 days after being laid, and ii) transferring the stacked hatcher baskets into a hatcher for the last three days of their incubation.

10. The method of claim 7, wherein the setter and/or hatcher each provide the eggs with controlled air flow and temperature for incubation.

* * * * *